US012755986B2

United States Patent
(12) United States Patent
Chung et al.

(10) Patent No.: US 12,755,986 B2
(45) Date of Patent: Oct. 6, 2026

(54) FUEL CELL SEPARATOR AND METHOD FOR MANUFACTURING SAME

(71) Applicants: Won Ki Chung, Seoul (KR); DONGWOO HST CO., LTD., Asan-si (KR)

(72) Inventors: Soo Jin Chung, Seoul (KR); Seung Gyun Ahn, Seoul (KR); Chang Hyun Shin, Incheon (KR); Se Heon Kim, Ansan-si (KR); Soon Tae Park, Incheon (KR)

(73) Assignees: Won Ki Chung, Seoul (KR); DONGWOO HST CO., LTD., Asan-si (KR)

( * ) Notice: Subject to any disclaimer, the term of this patent is extended or adjusted under 35 U.S.C. 154(b) by 716 days.

(21) Appl. No.: 18/246,454

(22) PCT Filed: Sep. 17, 2021

(86) PCT No.: PCT/KR2021/012786

§ 371 (c)(1),
(2) Date: Mar. 23, 2023

(87) PCT Pub. No.: WO2022/065818

PCT Pub. Date: Mar. 31, 2022

(65) Prior Publication Data

US 2023/0395821 A1 Dec. 7, 2023

(30) Foreign Application Priority Data

Sep. 23, 2020 (KR) ........................ 10-2020-0122838
Sep. 23, 2020 (KR) ........................ 10-2020-0122839
(Continued)

(51) Int. Cl.
*H01M 8/0213* (2016.01)
*H01M 8/0206* (2016.01)
(Continued)

(52) U.S. Cl.
CPC ....... *H01M 8/0213* (2013.01); *H01M 8/0206* (2013.01); *H01M 8/0226* (2013.01);
(Continued)

(58) Field of Classification Search
CPC .................................................. H01M 8/0213
See application file for complete search history.

(56) References Cited

U.S. PATENT DOCUMENTS

2019/0058201 A1* 2/2019 Kim .................... H01M 8/0228
2019/0363372 A1* 11/2019 Topalski ............. H01M 8/0247

FOREIGN PATENT DOCUMENTS

JP 2006-286457 A 10/2006
JP 2010-129393 A 6/2010
(Continued)

OTHER PUBLICATIONS

EESR for EP application No. 21872846.7, dated Jun. 20, 2025, 13 pages.
(Continued)

*Primary Examiner* — Brian R Ohara
(74) *Attorney, Agent, or Firm* — Renner, Otto, Boisselle & Sklar, LLP; Christopher P Harris

(57) ABSTRACT

The present disclosure relates to a separator for a fuel cell and a manufacturing method of the same. The manufacturing method of the separator for a fuel cell includes: an unevenness forming step of forming a fine-sized unevenness on a surface of a metal base material; and a coating layer forming step of forming a coating layer by coating carbon on the surface of the metal base material on which the unevenness is formed. Through the manufacturing method, it is possible to obtain an effect of improving water discharge performance and adhesion between the metal base material and the coating layer by forming unevenness on a surface of a metal base material, and then forming a coating layer.

9 Claims, 13 Drawing Sheets

(30) Foreign Application Priority Data

Sep. 16, 2021 (KR) ........................ 10-2021-0123774
Sep. 16, 2021 (KR) ........................ 10-2021-0123775

(51) Int. Cl.
*H01M 8/0226* (2016.01)
*H01M 8/0228* (2016.01)
*H01M 8/0254* (2016.01)
*H01M 8/026* (2016.01)

(52) U.S. Cl.
CPC ....... *H01M 8/0228* (2013.01); *H01M 8/0254* (2013.01); *H01M 8/026* (2013.01)

(56) References Cited

FOREIGN PATENT DOCUMENTS

| | | | |
|---|---|---|---|
| JP | 2011-243327 | A | 12/2011 |
| JP | 2018-159116 | A | 10/2018 |
| KR | 10-2015-0115381 | A | 10/2015 |

OTHER PUBLICATIONS

International Search Report and Written Opinion issued in connection with corresponding PCT Patent Application No. PCT/KR2021/012786 dated Dec. 30, 2021.

* cited by examiner

[Fig. 1]
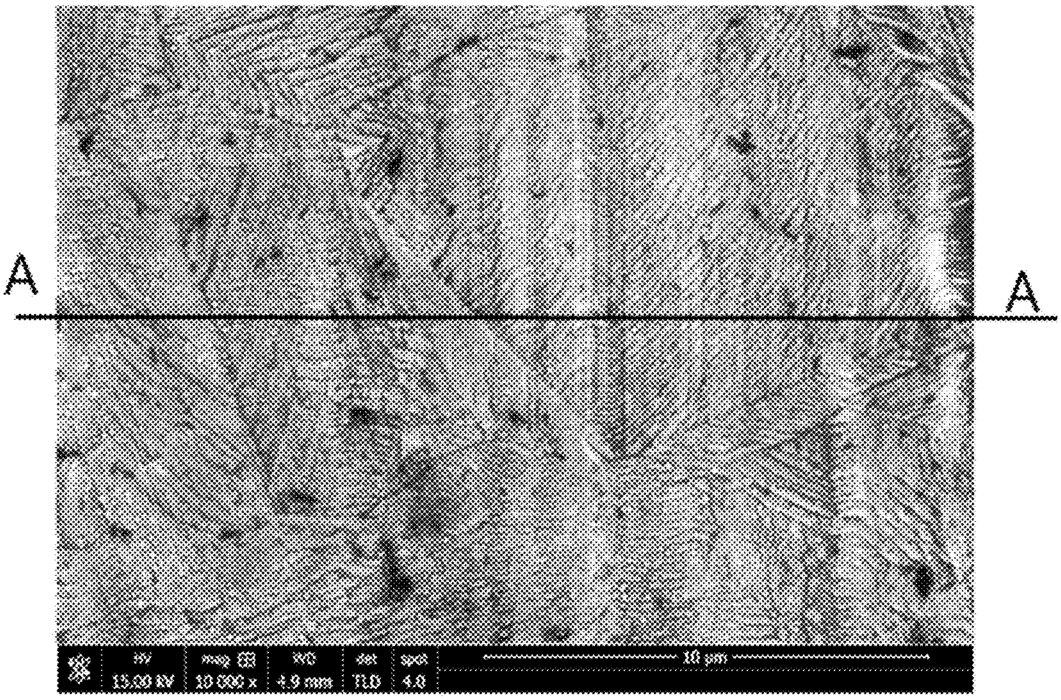

[Fig. 2]
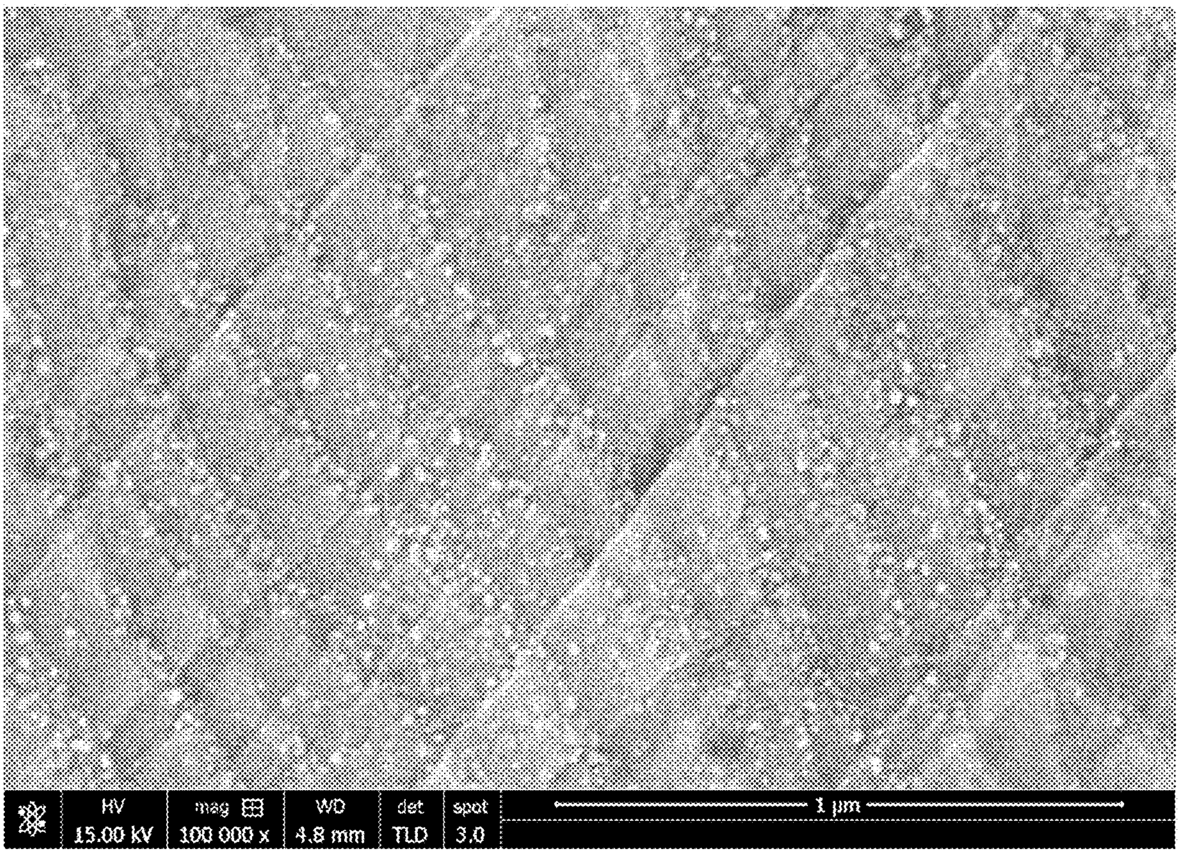

[Fig. 3]

[Fig. 4]
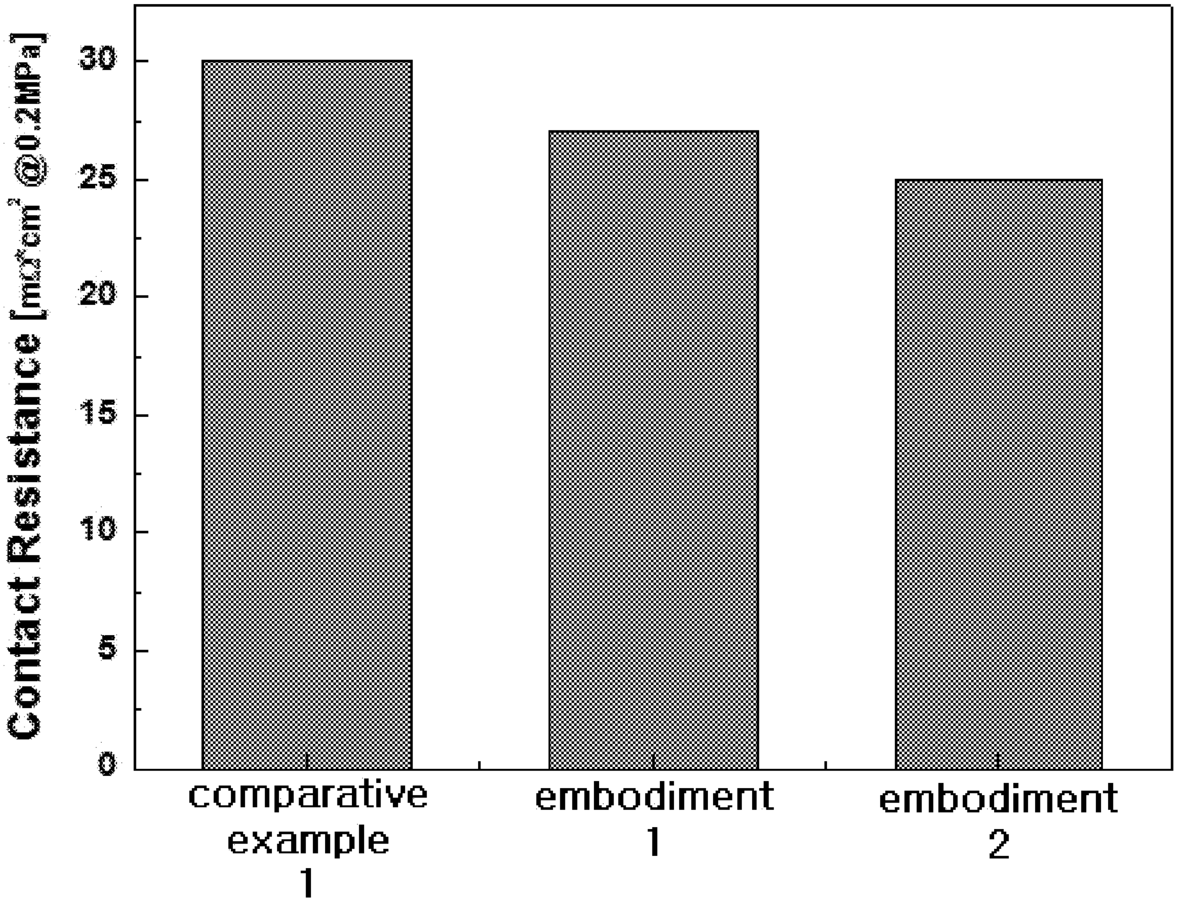

[Fig. 5]
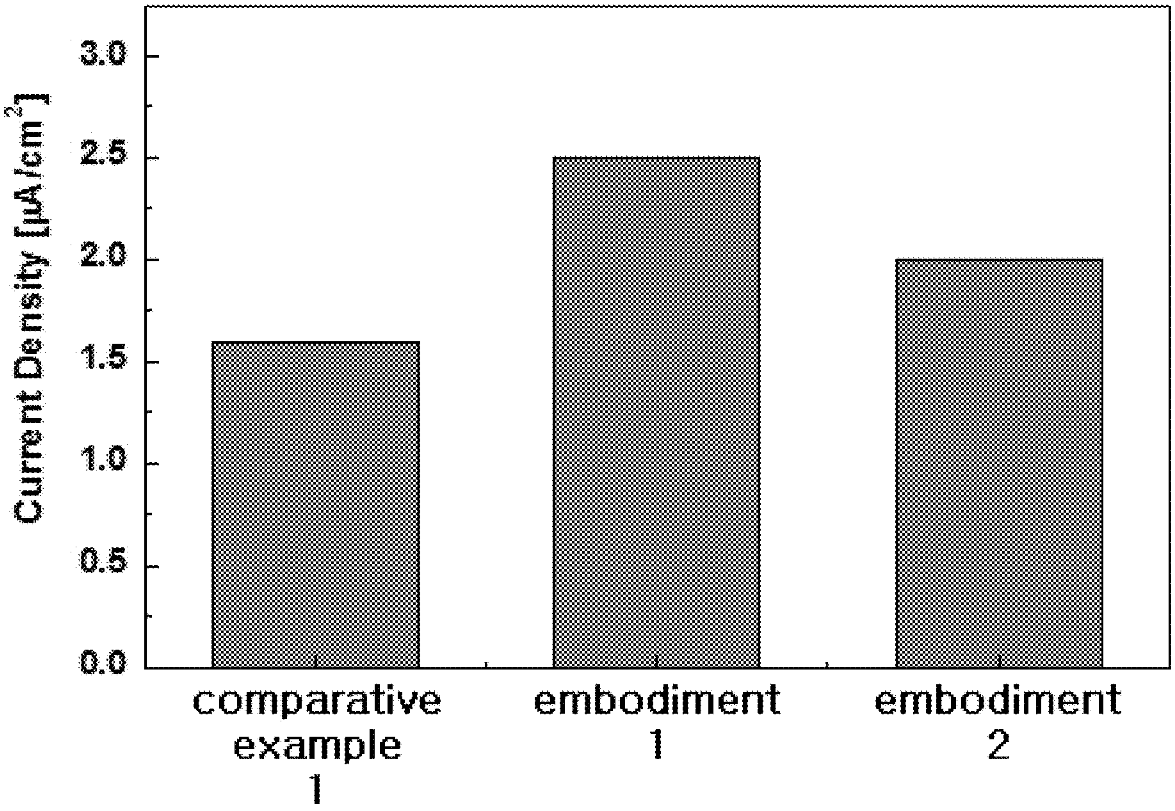

[Fig. 6]
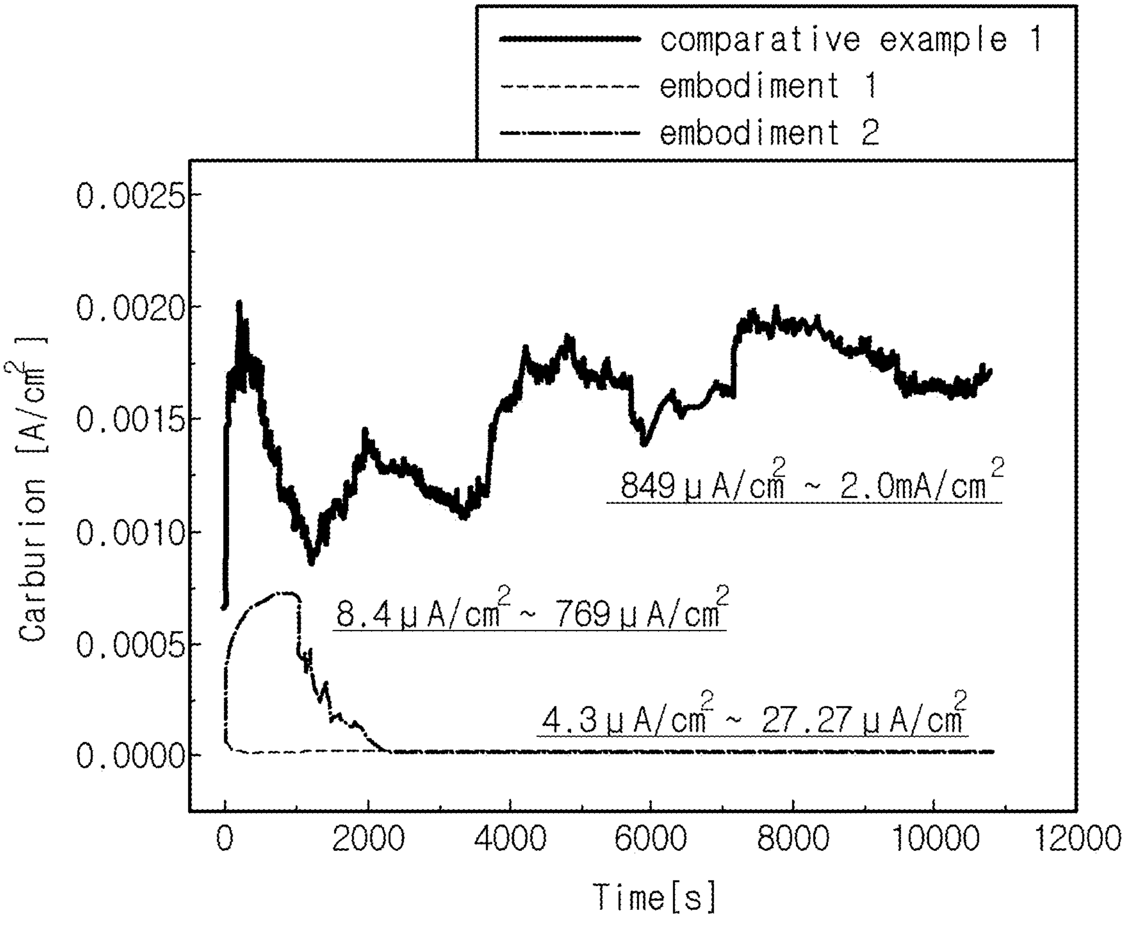

[Fig. 7]
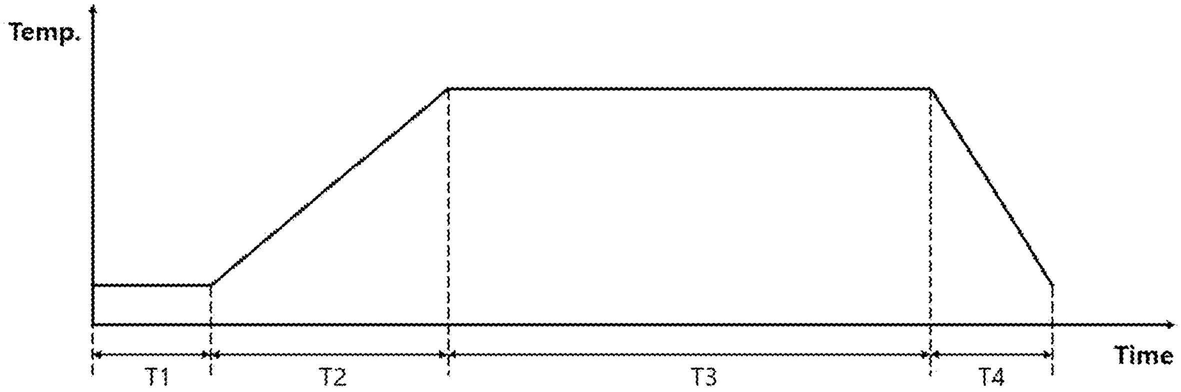

[Fig. 8]
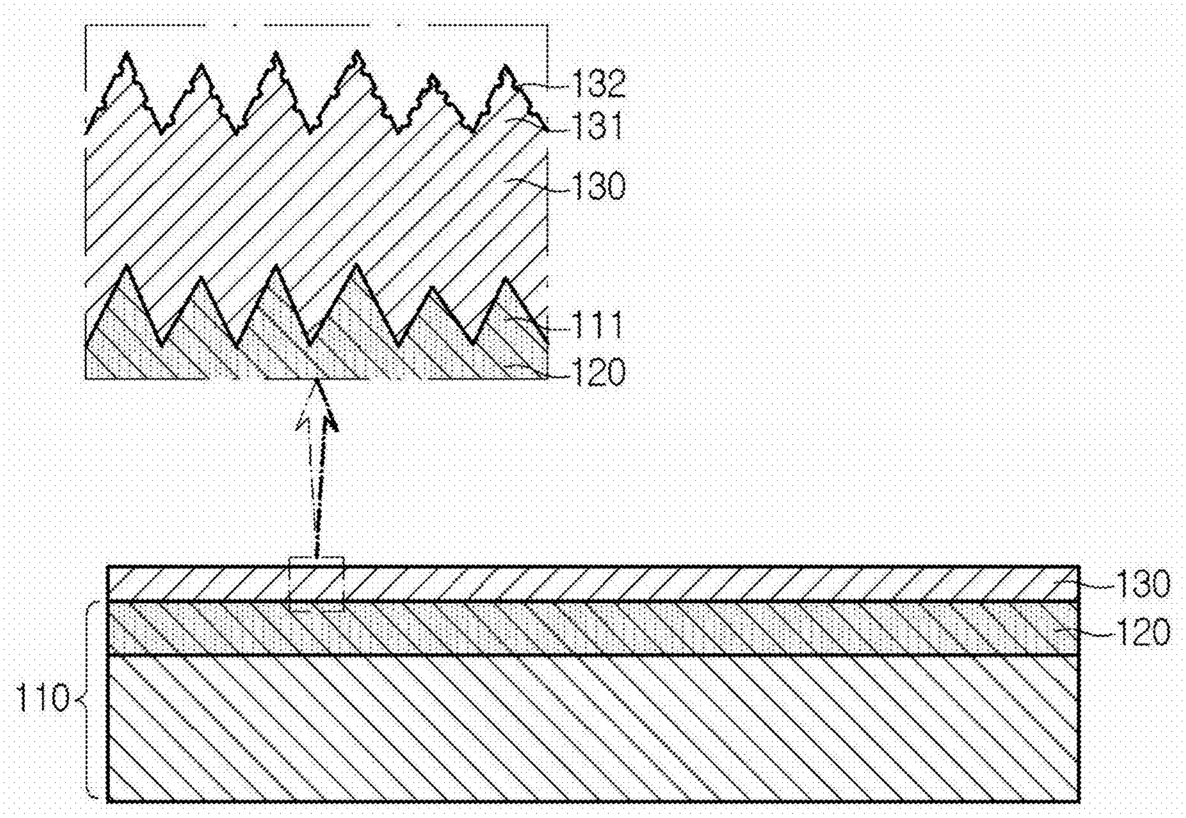

[Fig. 9]
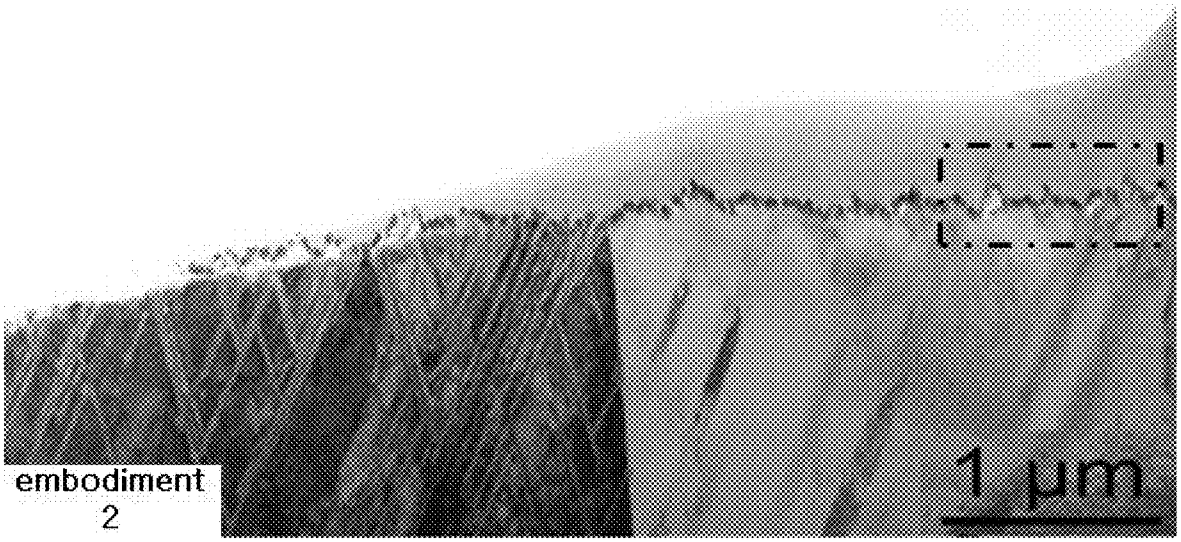

[Fig. 10]
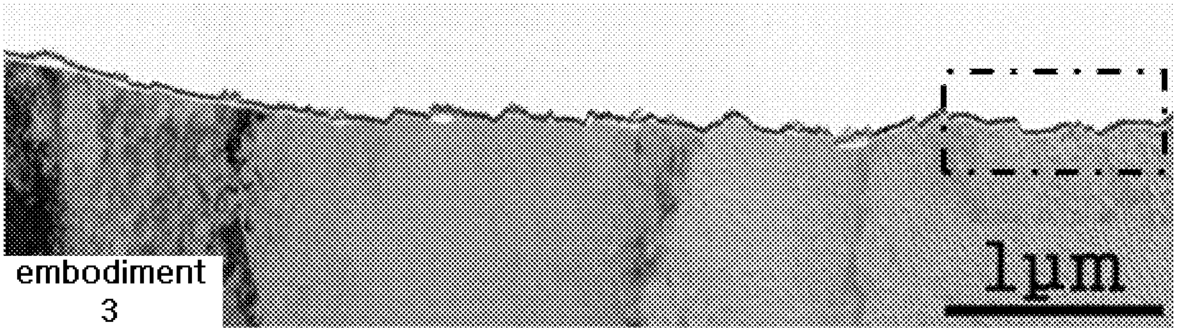

[Fig. 11]
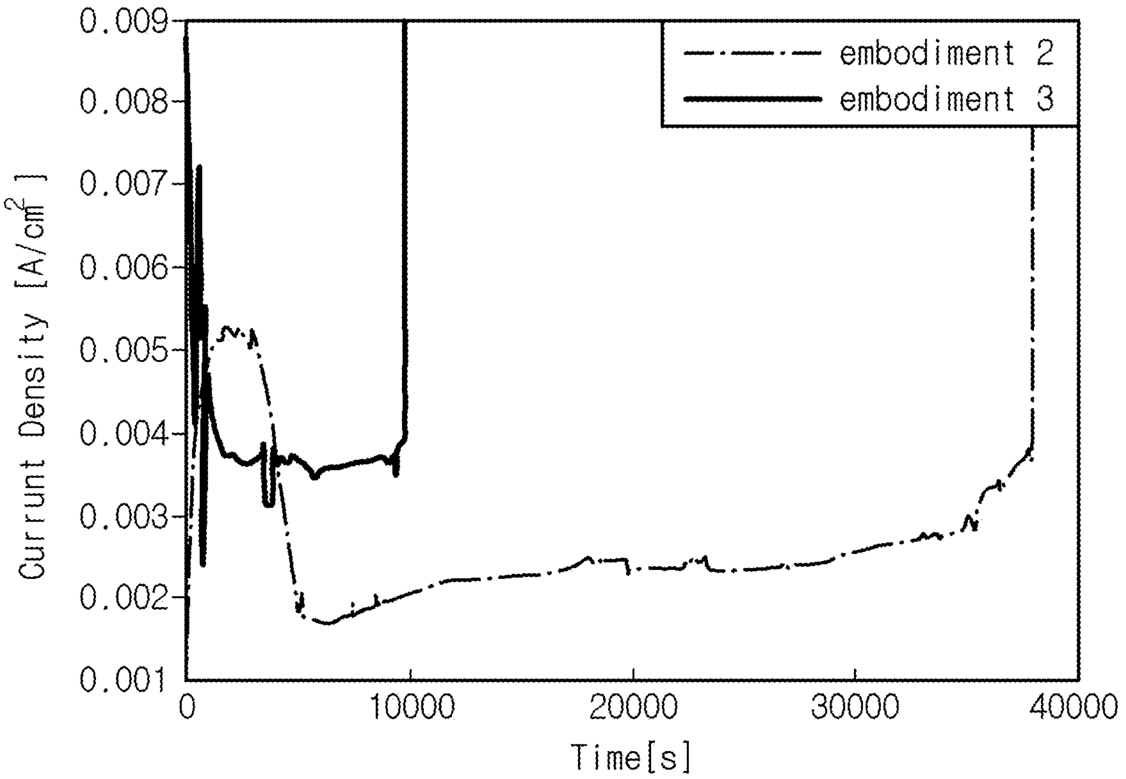

[Fig. 12]
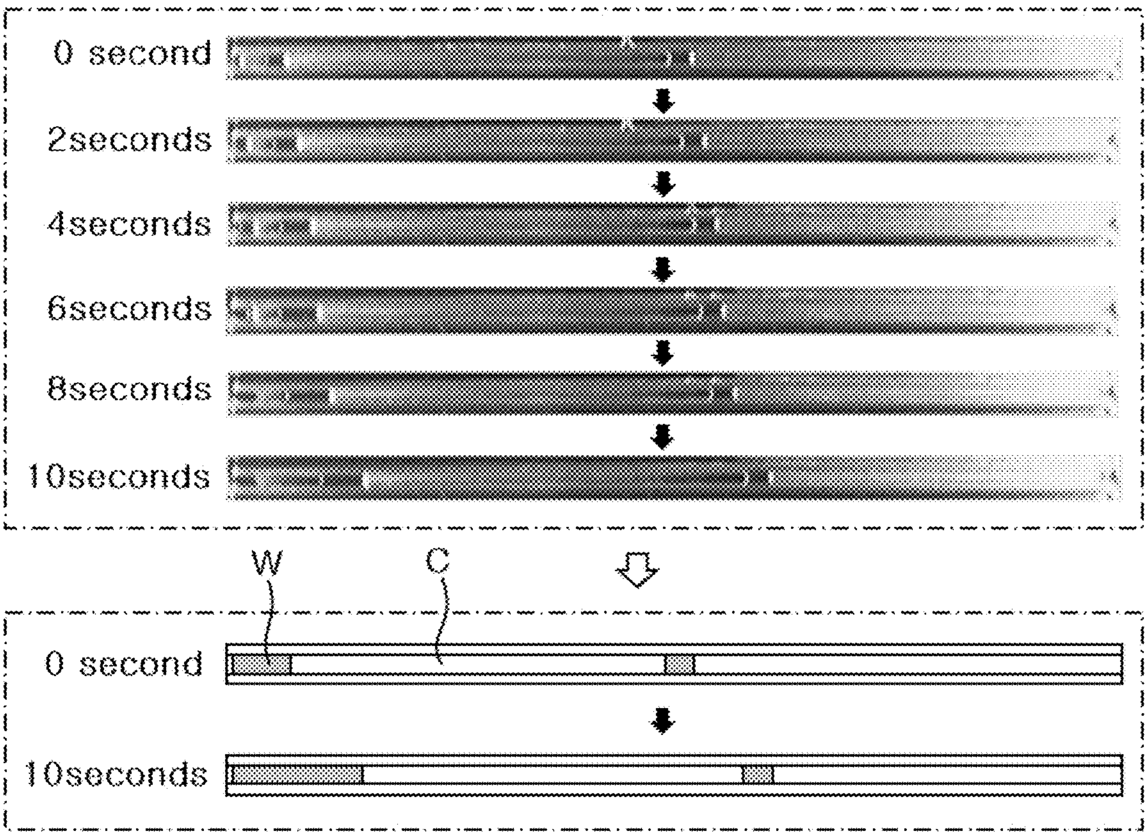

[Fig. 13]
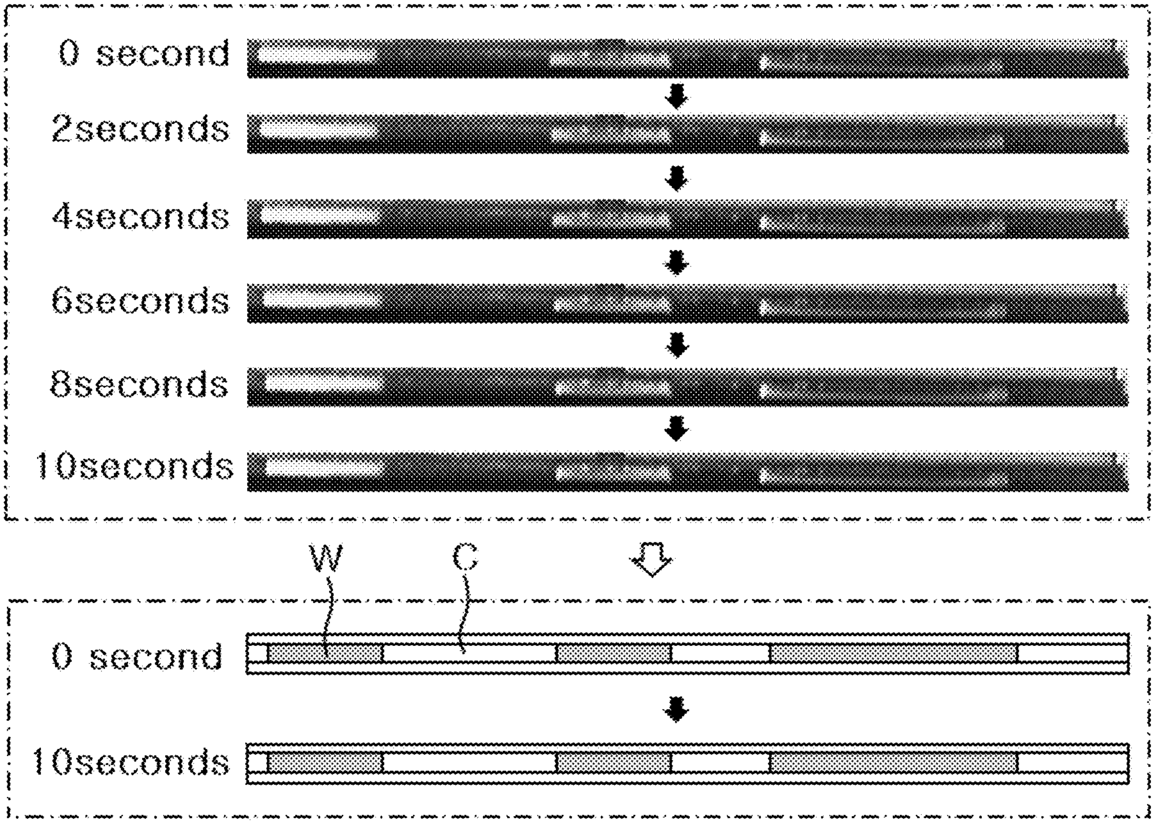

FUEL CELL SEPARATOR AND METHOD FOR MANUFACTURING SAME

RELATED APPLICATIONS

The present invention is a U.S. National Stage under 35 USC 371 patent application, claiming priority to PCT Application No. PCT/KR2021/012786, filed on Sep. 17, 2021, which claims priority from Korean Patent Application No. 10-2020-0122838 filed on Sep. 23, 2020, and Korean Patent Application No. 10-2020-0122839 filed on Sep. 23, 2020, and Korean Patent Application No. 10-2021-0123774 filed on Sep. 16, 2021, and Korean Patent Application No. 10-2021-0123775 filed on Sep. 16, 2021; the entireties of which are hereby incorporated herein by reference.

TECHNICAL FIELD

The present disclosure relates to a separator for a fuel cell and a manufacturing method of the same, and more particularly to a separator for a fuel cell, which forms unevenness on a surface of a metal base material, and then forms a coating layer, thereby improving water discharge performance and adhesion between the metal base material and the coating layer, and a manufacturing method of the same.

BACKGROUND ART

A fuel cell stack is a device that emits electricity, water, and heat by reaction between hydrogen and oxygen in the air. The fuel cell stack has many risk factors because high-voltage electricity, water, and hydrogen coexist in the same place.

The fuel cell stack includes a laminated structure including an electrode film, a separator, a gas diffusion layer, and a gasket, a fastening mechanism required to fasten a stack module, an enclosure that protects the stack, installation parts required for installation in a vehicle, and a high-voltage connectors, and the like.

In this case, the separator (hereinafter, referred to as "a separator for a fuel cell"), that is a part of the fuel cell stack, requires a resistance to corrosion due to direct contact with hydrogen cations generated during operation of the fuel cell.

In addition, when surface treatment is not performed on the separator for a fuel cell, not only corrosion, but also oxide generated on the surface of the metal acts as an electrical insulator, thereby reducing electrical conductivity. Here, dissociated and eluted metal cations contaminate a membrane electrode assembly (MEA), and thus, degrades the performance and durability of the fuel cell.

Accordingly, it is important for the separator for a fuel cell to obtain a low contact resistance and low corrosion current to improve the electrical conductivity and corrosion resistance. In this regard, researches are being actively devoted to a coating technology for the separator for a fuel cell.

However, when the fuel cell is used for a long time, an electric potential having a range of tens to hundreds of volts is applied from a cell disposed on one side of the stack to a cell disposed on the opposite side. Accordingly, thermal fatigue is caused at the interface between the separator and the coating layer, and thus, there occurs a problem that micro-pores and micro-cracks are generated due to the difference caused by mismatch of thermal expansion coefficients.

Also, there is also a problem that the coating layer may be destroyed due to high fastening pressure when the stack is fastened.

DISCLOSURE

Technical Problem

The present disclosure is designed to solve the above-mentioned problem. The purpose of the present disclosure is to provide a separator for a fuel cell, which forms unevenness on a surface of a metal base material, and then forms a coating layer, thereby improving water discharge performance and adhesion between the metal base material and the coating layer, and a manufacturing method of the same.

Technical Solution

One embodiment is a manufacturing method of a separator for a fuel cell. The manufacturing method may include: an unevenness forming step of forming a fine-sized unevenness on a surface of a metal base material; and a coating layer forming step of forming a coating layer by coating carbon on the surface of the metal base material on which the unevenness is formed.

In the unevenness forming step, a diffusion layer may be formed by penetrating interfering particles between metal atoms of the metal base material while removing a passivation film formed on the surface of the metal base material by a gas carburizing process, so that the unevenness is formed on the surface of the metal base material.

In the unevenness forming step, at least one of a size of the unevenness and the amount of unevenness per unit area may be controlled by adjusting a depth of the diffusion layer.

In the unevenness forming step, a depth of the diffusion layer may be adjusted by adjusting at least one of a main treatment temperature and a main treatment time in the gas carburizing process.

In the unevenness forming step, the diffusion layer may be formed to a depth of 2 μm to 20 μm on the basis of the surface of the metal base material.

In the unevenness forming step, the unevenness may be formed in the form of a sinusoidal waveform with a width of 20 nm to 500 nm and a depth of 10 nm to 500 nm.

The interfering particles may include at least one of a nitrogen ion and a carbon ion. In the coating layer forming step, after the unevenness is formed on the surface of the metal base material in the same manner as the gas carburizing process of the unevenness forming step, the coating layer may be formed by laminating carbon such that a fine-sized unevenness corresponding to the unevenness of the metal base material is formed.

In the coating layer forming step, the coating layer may be formed in such a way as to have a porous surface.

In the coating layer forming step, the coating layer may be formed to have a thickness of 2 nm to 200 nm.

Another embodiment is a separator for a fuel cell which is disposed on both sides of a membrane electrode assembly in a fuel cell stack and has a plurality of flow channels.

More specifically, the separator for a fuel cell may include: a metal base material which has the plurality of flow channels and a fine-sized unevenness formed on a surface thereof; and a coating layer which is formed by coating carbon on the surface of the metal base material such that a fine-sized unevenness corresponding to the unevenness of the metal base material is formed.

Here, the metal base material may further include a diffusion layer that is formed to a predetermined depth by that interfering particles penetrate between metal atoms of the metal base material.

The diffusion layer may be formed to a depth of 2 μm to 20 μm on the basis of the surface of the metal base material.

The diffusion layer may include at least one of a nitrogen ion and a carbon ion.

The unevenness may be formed in the form of a sinusoidal waveform with a width of 20 nm to 500 nm and a depth of 10 nm to 500 nm.

The coating layer may have a porous surface by forming a plurality of micro-pores on its surface.

The coating layer may be formed to have a thickness of 2 nm to 200 nm.

Advantageous Effect

According to the separator for a fuel cell and a manufacturing method of the same according to the embodiment of the present disclosure, it is possible to obtain an effect of improving water discharge performance and adhesion between the metal base material and the coating layer by forming unevenness on a surface of a metal base material, and then forming a coating layer.

DESCRIPTION OF DRAWINGS

FIGS. 1 and 2 are FESEM photographs showing a surface of a separator for a fuel cell, which is manufactured by a manufacturing method of the same according to an embodiment of the present disclosure;

FIG. 3 is a TEM photograph taken along line A-A' of FIG. 1;

FIG. 4 is a graph comparing a contact resistance of the separator for a fuel cell, which is manufactured by the manufacturing method according to the embodiment of the present disclosure and a contact resistance of a conventional separator for a fuel cell;

FIG. 5 is a graph comparing a dynamic electric potential measurement result of the separator for a fuel cell, which is manufactured by the manufacturing method according to the embodiment of the present disclosure and a dynamic electric potential measurement result of the conventional separator for a fuel cell;

FIG. 6 is a graph comparing a static electric potential measurement result of the separator for a fuel cell, which is manufactured by the manufacturing method according to the embodiment of the present disclosure and a static electric potential measurement result of the conventional separator for a fuel cell;

FIG. 7 is a graph showing a temperature condition of a manufacturing process time in the manufacturing method of the separator for a fuel cell according to the embodiment of the present disclosure;

FIG. 8 is a cross sectional view schematically showing the separator for a fuel cell, which is manufactured by the manufacturing method according to the embodiment of the present disclosure;

FIGS. 9 and 10 are TEM photographs showing that unevenness is formed on a surface of the separator for a fuel cell, which is manufactured by the manufacturing method according to the embodiment of the present disclosure;

FIG. 11 is a graph showing a comparison of static electric potential measurement results of the separator for a fuel cell, which is manufactured by the manufacturing method according to the embodiment of the present disclosure;

FIG. 12 includes a photograph showing the measurement of a water discharge state and a view showing specifically the measurement, in the separator for a fuel cell, which is manufactured by the manufacturing method according to the embodiment of the present disclosure; and FIG. 13 includes a photograph showing the measurement of a water discharge state and a view showing specifically the measurement, in the conventional separator for a fuel cell.

MODE FOR INVENTION

As the present invention can have various embodiments as well as can be diversely changed, specific embodiments will be illustrated in the drawings and described in detail. While the present invention is not limited to particular embodiments, all modification, equivalents and substitutes included in the spirit and scope of the present invention are understood to be included therein.

In the description of the present invention, while terms such as the first and the second, etc., can be used to describe various components, the components may not be limited by the terms mentioned above. The terms are used only for distinguishing between one component and other components. For example, the first component may be designated as the second component without departing from the scope of rights of the invention. Similarly, the second component may be designated as the first component.

The term of "and/or" includes a combination or one of a plurality of related items mentioned.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to another component, it should be understood that there is no component therebetween.

Terms used in the present specification are provided for description of only specific embodiments of the present invention, and not intended to be limiting. An expression of a singular form includes the expression of plural form thereof unless otherwise explicitly mentioned in the context.

In the present specification, it should be understood that the term "include" or "comprise" and the like is intended to specify characteristics, numbers, steps, operations, components, parts or any combination thereof which are mentioned in the specification, and intended not to previously exclude the possibility of existence or addition of at least one another characteristics.

Unless otherwise defined, all terms used herein including technical and scientific terms have the same meaning as commonly understood by one of ordinary skill in the art to which the present invention belongs. Terms, for example, commonly used terms defined in the dictionary, are to be construed to have exactly the same meaning as that of related technology in the context. As long as terms are not clearly defined in the present application, the terms should not be ideally or excessively construed as formal meaning.

Also, the embodiment is provided for giving those skilled in the art more complete description. Therefore, the shapes and sizes and the like of components of the drawings may be exaggerated for clarity of the description.

Hereinafter, preferred embodiments of the present invention will be described in detail with reference to the accompanying drawings.

FIGS. 1 and 2 are field emission scanning electron microscopy (FESEM) photographs showing a surface of a separator for a fuel cell, which is manufactured by a manufacturing method of the same according to an embodiment of the present disclosure. FIG. 3 is a TEM photograph taken along line A-A' of FIG. 1.

FIGS. 4 to 6 graphs comparing contact resistances, dynamic electric potential measurement results, and static electric potential measurement results of the separator for a fuel cell, which is manufactured by the manufacturing method according to the embodiment of the present disclosure and a conventional separator for a fuel cell.

FIG. 7 is a graph showing a temperature condition of a manufacturing process time in the manufacturing method of the separator for a fuel cell according to the embodiment of the present disclosure. FIG. 8 is a cross sectional view schematically showing the separator for a fuel cell, which is manufactured by the manufacturing method according to the embodiment of the present disclosure.

FIGS. 9 and 10 are TEM photographs showing that unevenness is formed on a surface of the separator for a fuel cell, which is manufactured by the manufacturing method according to the embodiment of the present disclosure. FIG. 11 is a graph showing a comparison of static electric potential measurement results of the separator for a fuel cell, which is manufactured by the manufacturing method according to the embodiment of the present disclosure.

FIG. 12 includes a photograph showing the measurement of a water discharge state and a view showing specifically the measurement, in the separator for a fuel cell, which is manufactured by the manufacturing method according to the embodiment of the present disclosure. FIG. 13 includes a photograph showing the measurement of a water discharge state and a view showing specifically the measurement, in the conventional separator for a fuel cell.

Referring to FIGS. 1 to 13, a method of manufacturing a separator for a fuel cell according to an embodiment of the present disclosure may include an unevenness forming step of forming a fine-sized unevenness 111 on a surface of a metal base material 110, and a coating layer forming step of forming a coating layer 130 by coating carbon on the surface of the metal base material 110 on which the unevenness 111 is formed.

For example, in the unevenness forming step, a diffusion layer 120 is formed by penetrating interfering particles between metal atoms of the metal base material 110 while removing a passivation film formed on the surface of the metal base material 110 by a gas carburizing process, so that the unevenness 111 may be formed on the surface of the metal base material 110.

Here, the diffusion layer 120 is formed within the metal base material 110, and is a penetration layer which is formed by that the interfering particles penetrate into the metal base material 110 in such a way as to have a predetermined depth from the surface of the metal base material 110. That is, the diffusion layer 120 is not separately laminated on the surface of the metal base material 110.

Further, the method of forming the unevenness on the surface of the metal base material is not limited thereto, and various known methods such as a plasma treatment may be applied.

That is, the metal base material 110 is a metallic material used for the separator for a fuel cell and may be a stainless-steel plate, more specifically, a SUS 300 series steel plate. The metal atom of the metal base material 110 may include iron (Fe) atoms, chromium (Cr) atoms, nickel (Ni) atoms, or molybdenum (Mo) atoms.

The interfering particles penetrate into the metal base material 110 and are interposed between the metal atoms, that is, are interposed within an austenite face-centered cubic (FCC) lattice, so that the unevenness 111 is formed on the surface of the metal base material 110.

Here, the interfering particles may include at least one of nitrogen ion and carbon ion.

Also, in the coating layer forming step, after the unevenness 111 is formed on the surface of the metal base material 110 in the same manner as the gas carburizing process of the unevenness forming step, the coating layer 130 is formed by laminating carbon such that a fine-sized unevenness 131 corresponding to the unevenness 111 of the metal base material 110 is formed.

Here, in the coating layer forming step, after the diffusion layer is formed by a main treatment T1 of the gas carburizing process shown in FIG. 7, that is to say, in a state where the diffusion layer is not able to penetrate into the metal base material any more, carbon atoms are deposited to form the coating layer.

Accordingly, a surface of the coating layer is coated to have unevenness corresponding to the shape of the unevenness formed on the metal base material by the diffusion layer.

Currently, researches on a coating technology for the separator for a fuel cell are being devoted in various ways to the improvement of the adhesion between the metal base material and the coating layer.

First, there is a method of forming a coating layer by depositing a material such as chromium (Cr), titanium (Ti), or the like which has a similar thermal expansion coefficient to that of the metal base material, as a buffer layer, in order to improve the adhesion between the metal base material and the coating layer.

Second, there is a method of improving the adhesion between the metal base material and the coating layer by forming a projection layer between the metal base material and the coating layer by using a high voltage and low current bias, through use of a plasma enhanced chemical vapor deposition (PECVD) method which uses a high output power supply.

Third, there is a method of improving the adhesion between the metal base material and the coating layer by forming the unevenness on the surface of the metal base material by projecting ceramic balls or plastic balls onto the metal base material using a peening method before forming the coating layer on the metal base material.

Fourth, there is a method of improving the adhesion between the metal base material and the coating layer by forming the unevenness on the surface of the metal base material by chemical etching.

However, the first method is the most widely used method in order to improve the adhesion when forming the coating layer. Here, the first method can satisfy the durability at the level of 5,000 to 8,000 hours of use based on a passenger vehicle. However, it is difficult for the first method to satisfy the durability at the level of 25,000 hours or more of long-term use such as buses, trucks, trains, and ships.

In the second method, since iron (Fe) in the metal base material exists outside the projection layer during formation of the projection layer, corrosion resistance deteriorates when pores within the coating layer and the projection layer are connected.

In the third method, since it is not easy to equalize the peening strength to the front and rear surfaces of the metal base material, residual stresses of the front and rear surfaces of the metal base material do not match, causing the deformation of the metal base material.

Finally, the fourth method has a problem that excessive etching is caused in a specific region, that is, at a corner portion of a flow path of the separator, and then an active area with a gas diffusion layer (GDL) is reduced, so that the performance is deteriorated.

Therefore, the embodiment of the present disclosure uses, instead of using the above four methods, the gas carburizing process which is performed at a low temperature and low pressure and is capable of surface activation and carburization without damaging the surface of the metal while solving the problems occurring in the above four methods. Also, the unevenness is formed on the surface of the metal base material by using such a gas carburizing process.

Referring to FIG. 7, in the gas carburizing process applied in the embodiment of the present disclosure, after the metal base material is placed within the chamber, the inside of the chamber is evacuated (T1) and is exhausted to 0.5 torr to 3.5 torr, and an internal temperature of the chamber rises (T2) to 350° C. to 500° C. and is maintained at 350° C. to 500° C. for a certain period of time. Then, a main treatment is performed (T3) and cooling is performed (T4).

During the main treatment (T3) process, as the passivation film formed on the surface of the metal base material is removed, the interfering particles penetrate between metal atoms of the metal base material to form the diffusion layer, thereby forming the unevenness on the surface of the metal base material. When the interfering particles penetrate into the surface of the metal base material to a certain depth, and then cannot penetrate no longer, carbon atoms are deposited on the diffusion layer and coated to form the coating layer.

Here, if the temperature of the main treatment (T3) is less than 350° C., the diffusion layer is not formed, and if exceeds 500° C., thermal deformation occurs in the metal base material and chromium carbide (CrC) is formed in the diffusion layer, resulting in deterioration of corrosion resistance.

Therefore, in the embodiment of the present disclosure, the main treatment (T3) is performed at a temperature of 350° C. to 500° C.

In addition, the penetration depth of the diffusion layer can be adjusted by adjusting the temperature and time of the main treatment (T3).

In the method of manufacturing the separator for a fuel cell according to the embodiment of the present disclosure, in order to improve the adhesion between the metal base material and the coating layer, interstitial elements such as carbon (C) and nitrogen (N) are injected into the metal base material, and a compressive residual stress of the surface of the metal base material and plastic deformation with a slip crystal plane are controlled, so that the nano-scale unevenness is formed on the surface of the metal base material in the form of a sinusoidal waveform.

Here, the unevenness may be formed to have a sinusoidal waveform with a width of nm to 500 nm and a depth of 10 nm to 500 nm.

Here, when the unevenness is less than 20 nm in width and 10 nm in depth, there is no water spreading and discharge effect due to capillary tension. In order to form the coating layer with a width and depth of more than 500 nm, the depth of the diffusion layer must be 30 μm or more. There is a problem that corrosion resistance is deteriorated due to the precipitation of $M_5C_2$ carbide in the ground boundary.

Therefore, in the embodiment of the present disclosure, the unevenness is formed on the surface of the metal base material in the form of a sinusoidal waveform with a width of 20 nm to 500 nm and a depth of 10 nm to 500 nm.

Then, the coating layer is formed by coating carbon such that the surface of the metal base material on which the unevenness is formed has a thickness of 2 nm to 200 nm.

Here, when the coating layer is formed to have a thickness of less than 2 nm, corrosion of a membrane electrode assembly is caused due to a coverage problem of a carbon coating material, and discoloration of the separator is caused due to attack of sulfur or fluorine ions. Also, the durability is degraded.

Also, when the coating layer is formed to have a thickness of more than 200 nm, the coating layer is easily exfoliated due to stress increase in the coating layer.

Therefore, in the embodiment of the present disclosure, the coating layer is formed to have a thickness of 2 nm to 200 nm on the metal base material.

Also, by forming the nano-sized sinusoidal unevenness at the interface between the metal base material and the coating layer, a surface area where the metal base material and the coating layer are in close contact is maximized, so that the adhesion is enhanced and a contact resistance with the gas diffusion layer is minimized.

Also, when more unevenness is formed at the interface between the metal base material and the coating layer, the adhesion between the metal base material and the coating layer can be further improved.

In the embodiment of the present invention, it was confirmed that the amount of unevenness per unit area on the surface of the metal base material increases as the depth of the diffusion layer is changed.

FIG. 9 shows that the unevenness formed on the surface of the metal base material when the depth of the diffusion layer is 7 μm to 8 μm (embodiment 2), and FIG. 10 shows that the unevenness formed on the surface of the metal base material when the depth of the diffusion layer is 0.5 μm to 1 μm (embodiment 3). Here, it can be seen that the size of the unevenness of the embodiments 2 and 3 does not change significantly. Therefore, the depth of the diffusion layer can be confirmed as a factor that changes the amount of unevenness.

FIGS. 9 and 10 each show a box having a length of 1 μm. Comparing the amount of unevenness formed within the box, it can be found that the embodiment 2 (FIG. 9) has a large number of fine unevenness and the embodiment 3 (FIG. 10) has relatively less unevenness than that of the embodiment 2.

Also, when comparing static electric potential measurement results of the embodiments 2 and 3 shown in FIG. 11, the embodiment 2 shows a higher current density than that of the embodiment 3 after a certain period of time has elapsed. Therefore, it can be found that the embodiment 2 is unstable because there occurs a problem such as ion elution, etc. Here, the static electric potential measurement is performed under the conditions of SCE electrode 1.0 V, 80° C., electrolyte 0.5 M $H_2SO_4$+2 ppm HF+$H_2O_2$.

The depth of the diffusion layer can be adjusted by the temperature and time of the main treatment process. In particular, in order to form a greater depth of the diffusion layer, the temperature of the process must be increased. However, when the temperature of the main treatment process is increased, there is, as discussed above, a problem that thermal deformation occurs in the metal base material or chromium carbide (CrC) is formed in the diffusion layer, resulting in deterioration of corrosion resistance.

Therefore, in the embodiment of the present disclosure, the depth of the diffusion layer can be formed up to 20 μm by performing the main treatment process at a temperature and time that do not cause such a problem. That is, in order to form the depth of the diffusion layer, which exceeds 20 μm, the temperature of the main treatment process must be increased, and thus the above problem may occur.

Therefore, in the embodiment of the present disclosure, the diffusion layer is formed to a depth of 2 μm to 20 μm on the basis of the surface of the metal base material.

[Adhesion]

In the embodiment of the present disclosure, the diffusion layer is formed to a depth of 2 μm to 20 μm on the basis of the surface of the metal base material, and unevenness having a width of 20 nm to 500 nm and a depth of 10 nm to 500 nm is formed in the form of a sinusoidal waveform in a predetermined quantity or more on the surface of the metal base material, so that the adhesion between the metal base material and the coating layer is improved.

Hereinafter, the adhesion of a comparative example 1 that is a conventional separator for a fuel cell, and the adhesion of the embodiments 1 and 2 that are the separator for a fuel cell manufactured according to the embodiment of the present disclosure will be compared in detail.

Here, in the comparative example 1, gold (Au) is formed as a coating layer on a metal base material.

Also, in the embodiment 1, after the depth of the diffusion layer is formed to 2 μm to 3 μm, carbon is formed as a coating layer. In the embodiment 2, after the depth of the diffusion layer is formed to 7 μm to 8 μm, carbon is formed as a coating layer.

Referring to FIG. 4, it can be seen that the embodiments 1 and 2 have a lower contact resistance than that of the comparative example 1. That is, when the contact resistance is high, the adhesion to the metal base material is low and electrical conductivity is reduced. Therefore, as the contact resistances of both the embodiments 1 and 2 are lower than that of the comparative example 1, it can be understood that the separator for a fuel cell according to the embodiment of the present disclosure has a more excellent electrical conductivity than that of the conventional separator for a fuel cell.

Also, since the depth of the diffusion layer of the embodiment 2 is greater than that of the embodiment 1, the amount of unevenness is greater than that of the embodiment 2. Accordingly, it can be discovered that the embodiment 2 has better adhesion than that of the embodiment 1, so that the contact resistance becomes lower.

FIG. 5 is a graph comparing and analyzing the results of the embodiments 1 and 2 and the comparative example 1 by performing dynamic electric potential measurement that is one of corrosion resistance evaluations of the separator for a fuel cell.

The dynamic electric potential measurement is performed under the conditions of saturated calomel electrode (SCE) electrode 0.6 V, pH 1, 80° C., 0.5M $H_2SO_4$+2 ppm F—.

Since the current density of both the embodiments 1 and 2 is higher than that of the comparative example 1, it can be found that both the embodiments 1 and 2 have better adhesion than that of the comparative example 1.

FIG. 6 is a graph comparing and analyzing the results of the embodiments 1 and 2 and the comparative example 1 by performing static electric potential measurement that is one of corrosion resistance evaluations of the separator for a fuel cell.

The static electric potential measurement is performed under the conditions of SCE electrode 1.0 V, pH 3, 80° C., three hours, electrolyte 0.005 M $H_2SO_4$+2 ppm F—.

Referring to FIG. 6, since the comparative example 1 shows a higher current density than those of the embodiments 1 and 2 after a certain period of time has elapsed. Therefore, it can be found that the comparative example 1 is unstable because there occurs a problem such as ion elution, etc.

[Water Discharge]

Water generated and condensed at an air electrode side by an electrochemical reaction of a fuel cell creates a harsh environment that hinders reaction gas from entering a catalyst layer and accelerates the corrosion of a metal separator but also degrades the performance and durability. Therefore, the water must be removed in real time through the flow path of the separator.

Water is generated at the cathode by oxidation-reduction reaction (ORR), and water is not easily discharged under the conditions of overcurrent and excessive humidity, resulting in water flooding, which causes a large amount of hydrogen peroxide ($H_2O_2$) and hydroxyl radical (OH—) to be generated, so that the membrane electrode assembly is attacked and degraded, and the fluorine ion concentration increases, causing the corrosion of the separator and the degradation of performance and durability.

Also, even at the anode, water flooding may occur even in a low current area under an open circuit voltage (OCV) condition and even in the case of a low cell temperature and backward diffusion of water, thereby causing hydrogen fuel to become lean at the anode. As a result, over potential current is generated and the separator and the membrane electrode assembly are attacked, so that the performance and durability are degraded.

Accordingly, surface treatment and coating layer formation are important in order to improve water discharge in consideration of the durability and performance of the metal separator.

For spontaneous and continuous water discharge, a contact angle must be less than 45°, and for smooth water discharge, the concus-finn condition $\beta+\alpha/2<90°$ (β: apparent contact angle, α: channel corner angle) must be satisfied.

Considering the concus-finn condition, gold (Au), a MAX phase material, carbon (C) coating, etc., which are being used as a representative coating material for the metal separator, have an apparent contact angle of 70° to 80°, so that the concus-finn condition is difficult to satisfy considering a flow channel angle of the metal separator.

Also, hydrophilic coating materials such as $SiO_2$, $TiO_2$, $TaO_2$, and $SnO_2$ lose their original hydrophilic properties by being combined with fluorine and sulfur ions coming out of the degraded membrane electrode assembly during the operation of a fuel cell.

In a polymer electrolyte fuel cell stack, smooth discharge of cooling water and moisture transfer on the surface of a gas transfer passage are one of factors determining the performance and durability. Although a passage pattern is the most important, the surface treatment of the separator material is also an important factor.

In water management, eventually, it is important that droplet generation is suppressed and water is discharged at a minimum pressure toward an outlet (Ex-Mani) when water is accumulated.

In particular, water management is particularly important in a high voltage and low current section under the open circuit voltage condition, that is, in a region of 0.2 A or less and 0.9 V and in a high-speed operation section, that is, in a region of 1 A or more and 0.6 V.

For example, when water is accumulated in the low current section of the anode, if a hydrogen flow rate is not high enough to discharge the water and the water is forcibly discharged by an air compressor, a very small amount of moisture of the membrane electrode assembly is also liable to be released, and thus, hydrogen ion conductivity may be reduced. Accordingly, an ohmic resistance increases and the performance may be degraded.

In the embodiment of the present disclosure, the Concus-finn condition and the Wenzel equation Cos $\theta^*$=rCos $\theta$ ($\theta^*$: apparent contact angle, r: roughness ratio, $\theta$: normal surface YOUNG contact angle) are introduced to adjust the surface roughness to induce the hydrophilic properties.

To this end, in the embodiment of the present disclosure, by optimizing the depth of the diffusion layer formed by carbon and nitrogen, the unevenness having a sinusoidal waveform with a width of 20 nm to 500 nm and a depth of 10 nm to 500 nm is formed on the surface of the metal base material, and then the coating layer having a thickness of 2 nm to 200 nm is formed thereon.

Here, since the coating layer is formed in the same gas carburizing process, the coating layer 130 is, as shown in FIG. 8, formed while forming the unevenness 111 on the surface of the metal base material 110, so that the unevenness 131 is also formed on the surface of the coating layer 130. Accordingly, the flow channel may show hydrophilic behaviors by the capillary force.

Also, since the coating layer 130 is formed by the gas carburizing process, micro-pores 132 are formed in the coating layer 130 to form the coating layer 130 having a porous surface. Such micro-pores 132 may induce hydrophilic behaviors together with the unevenness 131.

The diffusion layer is formed by penetrating the interfering particles that block the diffusion of carbon from the surface of the metal base material toward the inside of the metal base material. Here, the interfering particles may include at least one of nitrogen ions, boron ions, and carbon ions.

In the diffusion layer, the interfering particles may be interposed between the metal atoms of the metal base material. The meaning of what the interfering particles are interposed between the metal atoms is that the interfering particles penetrate into or dissolve in the austenite face-centered cubic (FCC) lattice.

Here, the interfering particles prevent carbon from diffusing into the metal base material during formation of the coating layer, thereby relatively improving the density and bonding strength of the coating layer. Therefore, a low contact resistance and low corrosion current are obtained to improve the electrical conductivity and corrosion resistance. If the diffusion layer is not separately formed, carbon of the coating layer, that is, carbon-carbon bonding of the carbon atoms is reduced, and thus, the density and bonding strength of the coating layer are decreased, resulting in deterioration of the electrical conductivity and corrosion resistance.

In a main body (stack) of a polymer electrolyte membrane fuel cell (PEMFC) that is a type of low-temperature fuel cell, components such as the membrane electrode assembly (MEA) in which an electrolyte membrane and positive electrodes (hydrogen electrode and air electrode) are integrated, the separator (a bipolar plate or a gas flow channel plate), a gasket, a current collector, and an end plate, etc., are connected in series by fastening bolts.

The separator is a key component constituting the main body of a fuel cell and is used in the greatest quantity together with the membrane electrode assembly. The separator is in electrical contact with the hydrogen electrode and air electrode of a unit battery cell, and hydrogen and air are supplied to the inside of each electrode through flow paths on both sides of the separator. In a fuel cell, the separator plays important roles such as supplying reaction gas, electrical conductivity, discharging water generated in the reaction, and internal thermal management, etc.

Such a metal separator of the fuel cell requires the following physical properties.

Since the metal separator functions as an electrical passage through which electrons generated by electrode reaction in the fuel cell move, high electrical conductivity or low interfacial contact resistance is required.

Also, since the metal separator serves as a passage for supplying reaction gas (hydrogen, oxygen, or air) involved in the electrode reaction and for immediately discharging water generated by the reaction to the outside, excellent water discharge performance is required.

Also, since the separator plays a role of separating the reaction gas supplied to the hydrogen electrode and the air electrode from being mixed in an acidic atmosphere, high corrosion resistance is required.

Austenitic stainless steel has excellent workability and is easy to form a flow path, and has excellent corrosion resistance due to the passivation film ($Cr_2O_3$) and is widely used as a material for the separator.

However, the presence of the passivation film has a trade-off relation that increases the corrosion resistance but conversely reduces interfacial electrical conductivity. Therefore, in order to apply a metal material to the separator, an additional surface modification treatment that can practically satisfy both the corrosion resistance and the electrical conductivity is required.

The embodiment of the present disclosure applies the gas carburizing process as a surface treatment method capable of improving the electrical conductivity without reducing the corrosion resistance. The austenitic stainless steel has the passivation film, so that it is not easy for carbon atoms to penetrate and diffuse into the metal base material. Therefore, a surface activation process for removing the passivation film is additionally required.

An existing widely used surface activation process utilizes halogenated gases including hydrogen chloride (HCl), and thus, not only causes environmental problems but also forms a Cr-depleted region on the surface of austenitic stainless steel, deteriorating the corrosion resistance.

Therefore, the embodiment of the present disclosure applies the gas carburizing process capable of surface activation and carburization without damaging the surface of the metal.

For example, a specific temperature and pressure, acetylene gas is adsorbed on the surface of the metal under a specific temperature and pressure, and radicals ($CH_3$*) which are decomposed and active species are generated. Not only the passivation film ($Cr_2O_3$) on the surface of the metal is removed by the generated radicals but carbon atoms are dissolved into the metal base material, so that the carburizing process is performed.

A thermochemical reaction of acetylene in a low temperature (350° C. to 500° C.) section is as follows.

$$C_2H_2 \rightarrow C_4H_4 \rightarrow CH_3^*$$

The carbon ions diffused into the metal base material are located at an octahedral site of the face centered cubic structure. Due to this, lattice distortion is caused and an S-phase layer that is an extended austenite region is formed. The oversupplied carbon accumulates on the surface of the steel to form the coating layer that is a high-concentration carbon layer.

By controlling the structure of the S-phase and the coating layer thus formed, it is possible to adjust characteristics such as corrosion resistance, electrical conductivity, and water discharge performance.

That is to say, through the gas carburizing process, as shown in FIG. 8, the coating layer 130 is formed while forming the unevenness 111 on the surface of the metal base material 110 to increase the adhesion between the metal base material 110 and the coating layer 130. Also, since the unevenness 131 is formed on the surface of the coating layer 130, the surface of the coating layer 130 may show hydrophilic behaviors by the capillary tension.

[Water Discharge Performance]

In a water discharge test, water discharge characteristics in the separator for a fuel cell manufactured according to the embodiment of the present disclosure and the conventional separator for a fuel cell including coated gold (Au) are evaluated.

In order to check water discharge behaviors of the separator for a fuel cell, the membrane electrode assembly (MEA) and the gas diffusion layer (GDL) are not attached. The separator is manufactured as a straight-line shaped flow path separator which has a length of activation part of 124 mm, a width of 35 mm, an active area of 43 $cm^2$, a flow path width of 0.5 mm, a flow path height of 0.6 mm, a thickness of the separator of 0.1 mm.

Also, test conditions are set such that a temperature is 65° C., a relative humidity is 100%, and an air speed is 1 m/s. In order to check the behavior of a droplet within the flow channel, images are taken in units of one second by using a charge-coupled device (CCD) camera.

Test results are shown in FIGS. 12 and 13.

In FIGS. 12 and 13, upper photos show the measurement of the behavior of the droplet W in the flow channel C in units of two seconds. For the purpose of easily identifying this, lower figures show the behaviors of the droplet W in the flow channel C in an initial state and in a state after 10 seconds.

While the carbon coating layer shows hydrophobic properties with the apparent contact angle of 80°, the coating layer according to the embodiment of the present disclosure has the unevenness and micro-pores, so that the behavior within the flow channel C shows hydrophilic properties because the droplet W has excellent wettability due to the capillary force.

As shown in FIG. 12, it can be seen that the droplet W is generated at an inlet and a central portion of the flow channel C in the initial state, and as time passes, the droplet W moves toward an outlet side of the flow channel C.

Here, the droplet W formed at the inlet of the flow channel C forms continuously a flow.

Compared with this, in the conventional separator for a fuel cell including coated gold (Au), as shown in FIG. 13, the droplet W is generated at the inlet, central portion, and outlet of the flow channel C in the initial state. Even though time passes, the droplet W does not flow and exists in the flow channel C in the same state as the initial state.

The gold (Au) shows hydrophobic behaviors with the apparent contact angle of 78°. Therefore, in the conventional separator without the unevenness and micro-pores, the behavior of the droplet W within the flow channel C shows hydrophobic properties.

Therefore, it is not easy for the conventional separator to discharge water, and the behavior of the droplet W has a discontinuous aspect, which may cause a problem of unstable voltage.

Also, since the air speed must be increased in order to facilitate water discharge in the conventional separator, there is a problem that energy consumption increases.

As such, the separator manufactured by the method of manufacturing the separator for a fuel cell according to the embodiment of the present disclosure is able to improve the adhesion between the metal base material and the coating layer by forming the unevenness on the surface of the metal base material, and is able to improve the water discharge performance by showing hydrophilic behaviors within the flow channel by forming the unevenness and micro-pores on the coating layer.

Although the present invention has been described above by way of the specific embodiments, this is for describing the present invention in detail. The present invention is not limited thereto and it is clear that the present invention can be modified or improved within the spirit of the present invention by those of ordinary skill in the art.

All simple modifications or changes of the present invention fall within the scope of the present invention. The specific scope of protection of the present invention will be apparent by the appended claims.

The invention claimed is:

1. A manufacturing method of a separator for a fuel cell, the manufacturing method comprising:

an unevenness forming step of forming an unevenness having a width of 20 to 500 nm and a depth of 10 to 500 nm on a surface of a metal base material; and a coating layer forming step of forming a coating layer by coating carbon on the surface of the metal base material on which the unevenness is formed, wherein in the unevenness forming step, a diffusion layer is formed by penetrating interfering particles between metal atoms of the metal base material while removing a passivation film formed on the surface of the metal base material by a gas carburizing process, so that the unevenness is formed on the surface of the metal base material.

2. The manufacturing method of claim 1, wherein, in the unevenness forming step, at least one of a size of the unevenness and the amount of unevenness per unit area is controlled by adjusting a depth of the diffusion layer.

3. The manufacturing method of claim 1, wherein, in the unevenness forming step, a depth of the diffusion layer is adjusted by adjusting at least one of a main treatment temperature and a main treatment time in the gas carburizing process.

4. The manufacturing method of claim 1, wherein, in the unevenness forming step, the diffusion layer is formed to a depth of 2 μm to 20 μm on the basis of the surface of the metal base material.

5. The manufacturing method of claim 1, wherein, in the unevenness forming step, the unevenness is formed in the form of a sinusoidal waveform.

6. The manufacturing method of claim 1, wherein the interfering particles comprise at least one of a nitrogen ion and a carbon ion.

7. The manufacturing method of claim 1, wherein, in the coating layer forming step, after the unevenness is formed on the surface of the metal base material in the same manner as the gas carburizing process of the unevenness forming step, the coating layer is formed by laminating carbon such that a fine-sized unevenness corresponding to the unevenness of the metal base material is formed.

8. The manufacturing method of claim 1, wherein, in the coating layer forming step, the coating layer is formed in such a way as to have a porous surface.

9. The manufacturing method of claim 1, wherein, in the coating layer forming step, the coating layer is formed to have a thickness of 2 nm to 200 nm.

* * * * *